Feb. 11, 1947.　　　J. F. MELICHAR　　　2,415,750
HYDRAULIC RELIEF VALVE
Filed Dec. 30, 1943

Inventor
Joseph F. Melichar.
By Mason, Porter & Diller
Attorneys

Patented Feb. 11, 1947

2,415,750

UNITED STATES PATENT OFFICE 2,415,750

HYDRAULIC RELIEF VALVE

Joseph F. Melichar, Cleveland, Ohio, assignor to The Parker Appliance Company, Cleveland, Ohio, a corporation of Ohio Application December 30, 1943, Serial No. 516,259

1 Claim. (Cl. 137—53)

The invention relates generally to valve structures and primarily seeks to provide a novel, simple and inexpensively constructed hydraulic relief valve wherein the yieldably seated valve means is so constructed and arranged as to offer a minimum of resistance to normal pressure flow, in which the valve member is held against its seat by a relatively light spring because of the provision on the valve member of a relatively small annular surface presented for unseating engagement by the pressure fluid, and in which the valve member and its seat are so related as to provide for a substantially large pressure relief flow upon slight lifting of the valve member from its seat.

With the above and other objects in view that will hereinafter appear, the nature of the invention will be more fully understood by following the detailed description, the appended claim and the several views illustrated in the accompanying drawing.

In the example of embodiment of the invention herein disclosed, the valve includes a generally rectangular body 5 having a reduced extension 6 at one end and having a reduced extension 7 at its other end.

Figure 1:
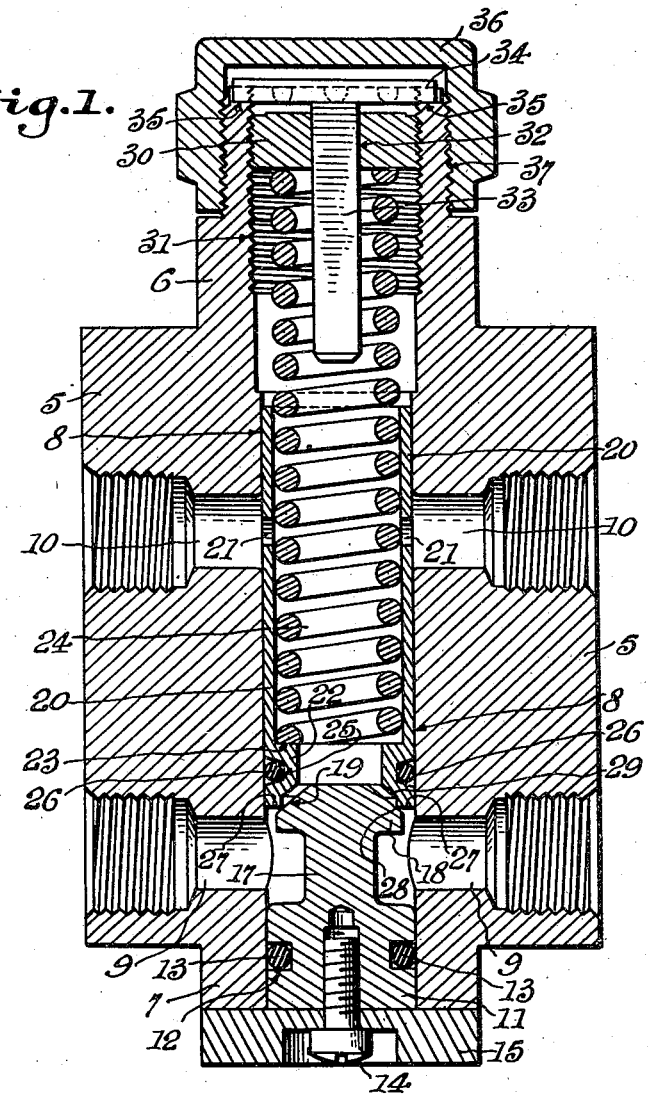
Figure 1 is a central vertical cross section of the improved valve structure.
Figure 2:
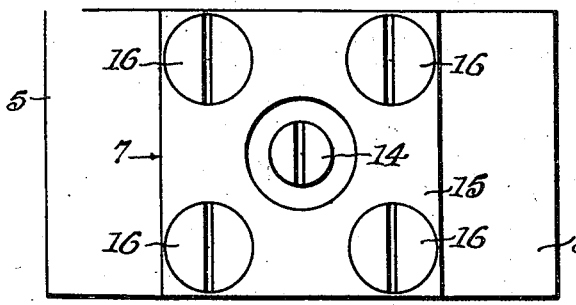
Figure 2 is an inverted plan view.

The body 5 is provided with a central longitudinal bore extending through both ends in the manner clearly illustrated in Figure 1. A transverse pressure bore 9 extends through the body 5 and intersects the lower portion of the valve bore 8. A transverse relief bore 10 extends through the body a considerable distance above the pressure bore 9 and also intersects the valve bore 8 in the manner clearly illustrated in Figure 1.

A cylindrical valve seat plug 11 snugly fits the lower end of the bore 8, and is provided with an annular groove 12 in which is mounted a packing ring 13 effective to seal the bore 8 against leakage around said plug. The plug 11 is screw-secured as at 14 to a mounting plate 15 which is in turn secured by screws 16 to the end of the body extension 7.

The valve seat plug 11 is provided with a reduced diameter cylindriform extension 17 which is disposed opposite the cross bore 9 in the manner clearly illustrated in Figure 1 so as to present a minimum resistance to normal pressure fluid flow through the said bore. On the upper end of the extension 17 is mounted a valve seat enlargement 18 which has an external diameter less than the internal diameter of the valve bore 8 so as to provide an annular passage surrounding the extension 18. The extension 18 is provided with a coniform seat surface 19.

A long valve member 20 in the form of a sleeve is mounted with a snug sliding fit in the valve bore 8 and extends from the position of the seat extension surface 19 to a point well beyond the transverse bore 10, and at the position opposite the bore 10 the valve sleeve is provided with ports 21 which afford communication between the interior of the valve sleeve and the relief port 10. Near its lower end the valve sleeve 20 is provided with an inward offset 22 presenting an abutment shoulder 23 for engagement with one end of the compression spring 24 which is mounted within the sleeve valve 20. An annular recess 25 is formed in the offset 22, and a packing ring 26 is mounted in the recess for sealing the valve bore 8 against leakage directly to the relief bore 10 about the exterior of the valve sleeve. Below the offset 22 the end of the valve member 20 presents an annular, relatively small area 27 for contact with pressure fluid about the exterior of the seat head or extension 18 in the manner clearly illustrated in Figure 1. The inner edge of the valve sleeve end engages in line contact with the coniform seat surface 19 as at 28. The offset 22 also presents a shoulder 29 which opposes the coniform seat surface 19 in parallel spaced relation as shown in Figure 1.

The compression spring 24 extends beyond the end of the sleeve valve 20 remote from the coniform seat 19 and engages the abutment nut 30 adjustably mounted in the internally threaded upper end 31 of the bore 8. The adjustable abutment nut 30 is equipped with a non-circular central opening 32 which slidably receives a non-circular adjuster stem 33. The stem 33 extends above the nut and is equipped with a transverse turning pin 34 which engages in selective cross recesses in the end of the body extension 6 for securing the pin and stem against rotation. A closure cap 36 threadably mounted on the body extension 6, as at 37, covers the adjuster stem 33 and pin 34 so as to protect them against tampering.

It will be obvious that the spring 24 normally holds the valve member or sleeve 20 seated against the coniform seat surface 19, and the resistance to opening of the valve by pressure exerted upon the small annular area 27 at the seated end of the valve member 20 can be varied by turning the nut 30. When it is desired to adjust the position of the nut 30 so as to vary the effective value of the compression spring 34, the cap 36 is removed and the pin 34 is lifted out of the securing recesses 35 and used as a turning head to rotate the nut.

The valve structure described hereinabove is simple and efficient in operation and can be manufactured at a relatively low cost. So long as pressure in the pressure line cross bore 9 remains at or below the predetermined maximum, the relief valve 20 will remain seated and pressure flow through the bore 9 will go on substantially uninterrupted because of the particular shaping of the seat plug 11 opposite said bore. Whenever the pressure in the bore exceeds the maximum predetermined by adjustment of the nut 30, said pressure acting upon the relatively small annular end surface 27 of the valve sleeve 20 will unseat the valve and provide relief of pressure upwardly through the sleeve 20 and through the side wall ports 21 into the relief bore 10. By reason of providing the particular form of valve and seat structure herein disclosed, it is possible to use a relatively light spring to maintain the valve member in its normal, seated position. Also, when the valve member is unseated, only slightly, a relatively large relief flow passage results.

It is to be understood that the details of construction of the cooperating parts can be variously changed without departing from the spirit and scope of the invention, as defined in the appended claim.

I claim:

A hydraulic relief valve comprising a casing body having an elongated relief valve bore therein, a pressure line connection bore disposed transversely of and communicating with said valve bore and a return or drain line connection bore communicating with said valve bore and spaced therealong from said pressure line connection bore, a valve seat plug closing the valve bore adjacent the pressure line connection bore and having an extension therebeyond which terminates in a coniform seat and is smaller in diameter than said valve bore so as to provide a surrounding annular passage communicating between the pressure line connection bore and the valve bore, a long valve sleeve slidable in said valve bore and having an end thereof disposed for normally engaging in line contact against said coniform seat and presenting an annular surface transversely of the valve bore in opposition to pressure of fluid surrounding said extension, and a spring normally holding the sleeve on its seat but compressible upon imposition of a predetermined pressure on the seated end of the sleeve to permit unseating of the sleeve and relief of pressure through the sleeve to the return or drain line connection port, said sleeve being of a length for extending beyond the return line bore and for encasing a major part of the length of said spring, said sleeve also having an aperture opposite the return bore and communicating between its interior and said return bore and also an inward offset spaced a short distance from the valve seat engaging end thereof and providing a shoulder abutment for the spring means, said offset including a wall portion opposing the coniform seat in parallel spaced relation and spaced by a cylindrical wall portion of short length extending from the sleeve end portion engaging in line contact with the seat, said offset also having an annular groove therein wherein is mounted a sealing ring engaging in sealing contact with the wall of the elongated relief valve bore.

JOSEPH F. MELICHAR.

REFERENCES CITED

The following references are of record in the file of this patent:

UNITED STATES PATENTS

| Number | Name | Date |
|---|---|---|
| 1,970,131 | Douglas | Aug. 14, 1934 |
| 2,308,753 | Hart | Jan. 19, 1943 |
| 2,295,931 | Caminez | Sept. 15, 1942 |
| 675,854 | Emery | June 4, 1901 |
| 1,767,841 | Fisher | June 24, 1930 |
| 2,249,206 | Hubard | July 15, 1941 |
| 2,280,937 | Thornhill | Apr. 28, 1942 |
| 1,870,927 | Schoene | Aug. 9, 1932 |
| 1,011,314 | Canner | Dec. 12, 1911 |